US009131555B2

(12) United States Patent
Seki et al.

(10) Patent No.: US 9,131,555 B2
(45) Date of Patent: Sep. 8, 2015

(54) LIGHTING DEVICE, LUMINAIRE, METHOD FOR DESIGNING LIGHTING DEVICE, AND METHOD FOR MANUFACTURING LIGHTING DEVICE

(71) Applicant: Panasonic Corporation, Osaka (JP)

(72) Inventors: Keisuke Seki, Osaka (JP); Takeshi Kamoi, Kyoto (JP); Daisuke Yamahara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/444,207

(22) Filed: Jul. 28, 2014

(65) Prior Publication Data
US 2015/0035453 A1 Feb. 5, 2015

(30) Foreign Application Priority Data

Aug. 2, 2013 (JP) ................................. 2013-161862

(51) Int. Cl.
H05B 37/02 (2006.01)
H05B 33/08 (2006.01)

(52) U.S. Cl.
CPC ..................................... *H05B 33/08* (2013.01)

(58) Field of Classification Search
USPC .......... 315/224, 246, 291, 294, 297, 307, 308
See application file for complete search history.

(56) References Cited

U.S. PATENT DOCUMENTS

| 6,057,651 | A  | * | 5/2000 | Usami ........................... 315/291 |
| 7,919,936 | B2 |   | 4/2011 | Liu et al. |
| 8,148,919 | B2 |   | 4/2012 | Liu et al. |
| 8,237,379 | B2 |   | 8/2012 | Liu |
| 8,253,352 | B2 |   | 8/2012 | Liu |
| 2008/0100231 | A1 | * | 5/2008 | Lee ................................. 315/287 |
| 2009/0273290 | A1 | * | 11/2009 | Ziegenfuss .................... 315/193 |
| 2009/0315473 | A1 | * | 12/2009 | Tsai et al. ...................... 315/291 |
| 2010/0033109 | A1 |   | 2/2010 | Liu et al. |
| 2011/0248648 | A1 |   | 10/2011 | Liu |
| 2011/0316447 | A1 |   | 12/2011 | Liu |
| 2012/0032613 | A1 |   | 2/2012 | Liu et al. |

FOREIGN PATENT DOCUMENTS

| JP | 2010-040509 | 2/2010 |
| JP | 2011-050126 | 3/2011 |
| JP | 2011-210659 | 10/2011 |
| JP | 2012-043657 | 3/2012 |
| JP | 2012-109141 | 6/2012 |
| JP | 2013-016855 | 1/2013 |

* cited by examiner

*Primary Examiner* — Tung X Le
(74) *Attorney, Agent, or Firm* — Renner, Otto, Boisselle & Sklar, LLP

(57) ABSTRACT

A lighting device that is connected to a DC power source and supplies an electric current to a solid-state light-emitting element (LED) whose forward voltage ranges from Vfmin to Vfmax includes a DC/DC converter (buck converter) and a control unit. The DC/DC converter includes a switching element. The control unit turns OFF the switching element by peak current control, and when the solid-state light-emitting element to be connected to the lighting device has a forward voltage of Vfmax, turns ON the switching element in fixed cycles such that the DC/DC converter operates in BCM.

16 Claims, 9 Drawing Sheets

LIGHTING DEVICE, LUMINAIRE, METHOD FOR DESIGNING LIGHTING DEVICE, AND METHOD FOR MANUFACTURING LIGHTING DEVICE

CROSS REFERENCE TO RELATED APPLICATION

This application claims the benefit of priority of Japanese Patent Application Number 2013-161862, filed Aug. 2, 2013, the entire content of which is hereby incorporated by reference.

TECHNICAL FIELD

The disclosure relates to a lighting device for a solid-state light-emitting element such as a light emitting diode (LED), a luminaire including the lighting device, and a method for designing the lighting device.

BACKGROUND ART

Solid-state light-emitting elements such as LEDs have shown promise as light sources of various products because of their small size, high efficiency and long life.

In order to light up the LEDs stably, it is desired that lighting devices for lighting up the LEDs should be under constant current control of outputting a constant output electric current for any LED serving as a load. The reason is as follows: the voltage-current characteristics of the LEDs have a non-linear feature in which an electric current starts flowing at a certain applied voltage or higher, and a forward voltage does not substantially change while an electric current near a rated current value is flowing; and light output of the LEDs basically depends on a value of an electric current that is flowing through the LEDs.

By providing control so that a constant electric current flows through the LEDs for any output voltage, the constant current control can reduce variations in light output in the case where there are variations in lighting voltage due to the individual difference among the LEDs. Also, even when loads having different rated lighting voltages are connected or even when the number of identical loads connected in series is changed, the constant current control can pass a constant electric current through the loads, thereby accommodating various connection load styles.

For example, a lighting device disclosed in Japanese Unexamined Patent Application Publication No. 2012-109141 attempts to realize the constant current control by operating a buck converter, which is a kind of DC/DC converters located in the lighting device, by boundary current mode (BCM) control and peak current control. The BCM control is a control system of turning ON a switching element in the buck converter when release of predetermined energy from an inductor in the buck converter is sensed. Also, the peak current control is a control system of turning OFF the switching element when a detection value of an electric current flowing through the switching element in the buck converter reaches a predetermined value.

In the BCM control, an average output electric current is half the electric current peak value. In the peak current control, when the electric current reaches a peak current reference value Iref, the switching element is turned OFF so as to match the peak value of an inductor electric current with the reference value Iref. Accordingly, it is possible to keep the output electric current at a constant value (½ of the current reference value Iref) regardless of the output voltage.

However, components constituting the buck converter have a delay time attributable to their response speed (for example, a delay time of a detection operation circuit, a signal output delay time of a driver IC, a drive delay time of the switching element, etc.). Thus, there occurs a delay time $\Delta T$ starting when the electric current flowing through the switching element reaches the peak current reference value Iref until the switching element is turned OFF to interrupt the electric current.

FIG. 1 illustrates how the inductor electric current varies over time under the BCM control.

In this figure, the inductor electric currents for different load voltages Vf1 and Vf2 are shown.

Due to the above-mentioned delay time, an actual peak value of the electric current flowing through the inductor exceeds the reference value Iref by $\Delta Ip$ as shown in FIG. 1.

When an input voltage of the buck converter pulsates, the load voltage of the buck converter varies. Thus, as shown in FIG. 1, an inclination of the inductor electric current also varies, resulting in variations in light output.

In response to the above problem, Japanese Unexamined Patent Application Publication No. 2012-109141 detects a voltage corresponding to the input voltage of the buck converter using a secondary winding of the inductor so as to correct the peak current reference value Iref.

On the other hand, Japanese Unexamined Patent Application Publication No. 2010-40509 discloses a circuit for equating electric currents flowing through a plurality of LEDs included in a lighting device. In the lighting device disclosed in this document, a common electric current reference value for the individual LEDs is set, and feedback control is performed so that an average electric current flowing through switching elements in buck converters that respectively supply an electric current to these LEDs coincides with the electric current reference value.

More specifically, the electric current flowing through the switching element of each buck converter is monitored, and the difference between a monitored electric current and the electric current reference value is calculated by an error amplifier. Then, by calculating a logical sum of an output of the error amplifier and a sawtooth waveform (a RAMP waveform), a duty ratio of a drive signal of the switching element is regulated so that an average value of the monitored electric current and the electric current reference value are equated with each other during a period in which the switching element is in an ON state. In such a control, the constant current control is performed normally in a continuous current mode (CCM).

SUMMARY

Although the delay time $\Delta T$ of the components constituting the buck converter has been considered, the lighting device disclosed in Japanese Unexamined Patent Application Publication No. 2012-109141 is intended to solve the variations in output electric current due to the pulsation of the input voltage of the buck converter. Thus, such a technique cannot improve the electric current variations due to the delay time $\Delta T$ at the time of variations in output voltage. Accordingly, the output voltage-output current characteristics do not achieve perfectly constant electric current properties. For example, when the output voltages are Vf1 and Vf2 (Vf1<Vf2), the inductor electric current of the buck converter varies over time as shown in FIG. 1. As illustrated in this figure, since the lower output voltage shows a higher rate of change in electric current over time while the switching element is in the ON state, the difference ΔIp of the peak electric current from the reference value is larger.

FIG. 2 shows the relationship between the output voltage Vf of the buck converter and a load current Iout.

As shown in FIG. 2, an output electric current increases with a decrease in the output voltage. In a lighting device with such characteristics, problems could be caused in that the individual difference in voltage-current characteristics and temperature characteristics of LEDs to be connected bring about difference in light output depending on the LEDs and variations in light output over time. Further, when different kinds of loads having the same current rating and different voltage ratings are connected or when the number of loads connected in series is changed, there could be a problem that the difference in output voltage causes the output electric current to deviate from a rated value, so that a necessary light output cannot be obtained.

Further, in the lighting device disclosed in Japanese Unexamined Patent Application Publication No. 2010-40509, although the electric currents through the individual LEDs can be matched with the common electric current reference value, peripheral circuits such as the error amplifier are needed for constituting a feedback circuit. Consequently, the lighting device disclosed in this document requires higher cost than lighting devices including no feedback circuit.

Moreover, since the drive signal of the switching element is generated by calculating the logical sum of the output of the error amplifier and the sawtooth waveform, a switching frequency always coincides with a frequency of a sawtooth wave. In other words, the operation is basically performed in the CCM at a constant frequency. In the CCM, since the electric current flowing through the inductor of the buck converter is continuous and does not return to 0, the continuous electric current is turned ON/OFF. Thus, there arises a significant stress and loss, for example, a through-current flows through the components such as the switching element in the buck converter. This lowers a circuit efficiency, raises the cost of circuit components and increases a circuit size. The above-described technique is not suitable especially for high-power illumination uses.

The present invention has been made bearing the foregoing in mind, and it is an object of the present invention to provide a lighting device that uses a DC/DC converter to light up a solid-state light-emitting element and stabilizes light output with a simple configuration.

In order to achieve the object mentioned above, a lighting device according to one aspect of the present invention is a lighting device that is connected to a DC power source and supplies an electric current to a solid-state light-emitting element whose forward voltage ranges from Vfmin to Vfmax. The lighting device includes a DC/DC converter; and a control unit. The DC/DC converter includes: a switching element that is connected in series with the DC power source and turned ON and OFF; an inductor that is connected in series with the switching element and supplied with an electric current from the DC power source when the switching element is in an ON state; a diode that supplies, to the solid-state light-emitting element, an electric current released from the inductor; and a current detection circuit that detects an electric current flowing through the switching element and outputs a current detection value of the electric current that is detected. The control unit includes a comparator that compares the current detection value with an electric current reference value, is configured to (i) switch the switching element from the ON state to an OFF state when the control unit senses that the current detection value reaches the electric current reference value based on an output signal from the comparator, and (ii) switch the switching element from the OFF state to the ON state in fixed cycles, each of which being a period where timing at which the inductor finishes releasing the electric current and timing at which the switching element is switched from the OFF state to the ON state coincide with each other when the forward voltage of the solid-state light-emitting element connected to the lighting device is the Vfmax.

Also, in the lighting device according to one aspect of the present invention, the Vfmax may be larger than ½ of an output voltage value of the DC power source.

Further, in the lighting device according to one aspect of the present invention, the Vfmin may be larger than a difference between the output voltage value of the DC power source and the Vfmax.

Moreover, in the lighting device according to one aspect of the present invention, the control unit may further include a pulse generator that repeatedly outputs a pulse signal in the fixed cycles, the pulse generator determining the fixed cycles based on an output voltage value of the DC power source and a forward voltage value of the solid-state light-emitting element to be connected to the lighting device.

Additionally, a luminaire according to one aspect of the present invention includes any of the lighting devices described above, and a solid-state light-emitting element whose forward voltage ranges from Vfmin to Vfmax.

Furthermore, a lighting device according to another aspect of the present invention is a lighting device that is connected to a DC power source and supplies an electric current to a plurality of solid-state light-emitting elements. The lighting device includes: a plurality of DC/DC converters; and a control unit. The plurality of DC/DC converters each include: a switching element that is connected in series with the DC power source and turned ON and OFF; an inductor that is connected in series with the switching element and supplied with an electric current from the DC power source when the switching element is in an ON state; a diode that supplies, to one of the plurality of solid-state light-emitting elements, an electric current released from the inductor; and a current detection circuit that detects an electric current flowing through the switching element and outputs a current detection value of the electric current that is detected. The control unit includes: a sensing circuit that senses that the electric current through the inductor included in every one of the plurality of DC/DC converters is zero; and a plurality of comparators that are in one-to-one correspondence with the plurality of DC/DC converters. The plurality of comparators each compare the current detection value with an electric current reference value. The control unit is configured to (i) switch the switching element corresponding to one of the plurality of comparators from the ON state to an OFF state when the control unit senses that the current detection value reaches the electric current reference value based on an output signal from the one of the plurality of comparators, and (ii) switch the switching element included in every one of the plurality of DC/DC converters simultaneously from the OFF state to the ON state when the sensing circuit senses that the electric current through the inductor included in every one of the plurality of DC/DC converters is zero.

Also, in the lighting device according to one aspect of the present invention, the electric current reference value may be common to the plurality of comparators.

Moreover, in the lighting device according to one aspect of the present invention, Vfmax may be larger than ½ of an output voltage value of the DC power source, where Vfmax denotes a maximum forward voltage among forward voltages of the plurality of solid-state light-emitting elements.

Further, in the lighting device according to one aspect of the present invention, Vfmin may be larger than a difference between the output voltage value of the DC power source and the Vfmax, where Vfmin denotes a minimum forward voltage among the forward voltages of the plurality of solid-state light-emitting elements.

Additionally, a luminaire according to one aspect of the present invention includes any of the lighting devices described above, and a plurality of solid-state light-emitting elements.

With an aspect of the present invention, it becomes possible to achieve the lighting device that uses a DC/DC converter to light up a solid-state light-emitting element and stabilizes the light output with a simple configuration.

BRIEF DESCRIPTION OF THE DRAWINGS

The figures depict one or more implementations in accordance with the present teaching, by way of examples only, not by way of limitations. In the figures, like reference numerals refer to the same or similar elements.

DETAILED DESCRIPTION

Hereinafter, a lighting device and a luminaire according to embodiments of the present invention will be described, with reference to the accompanying drawings. It should be noted that any of the embodiments described in the following illustrates one specific preferable example of the present invention. Thus, the numerical value, shape, material, structural component, the arrangement and connection of the structural components, step, the order of steps and so on indicated in the following embodiments are merely an example and not intended to limit the present invention. Accordingly, among the structural components described in the following embodiments, the one not recited in an independent claim indicating the most generic concept of the present invention will be described as an arbitrary structural component.

Incidentally, each figure is a schematic view and not necessarily illustrated precisely.

Embodiment 1

First, a lighting device and a luminaire in Embodiment 1 of the present invention will be described.

Figure 3:
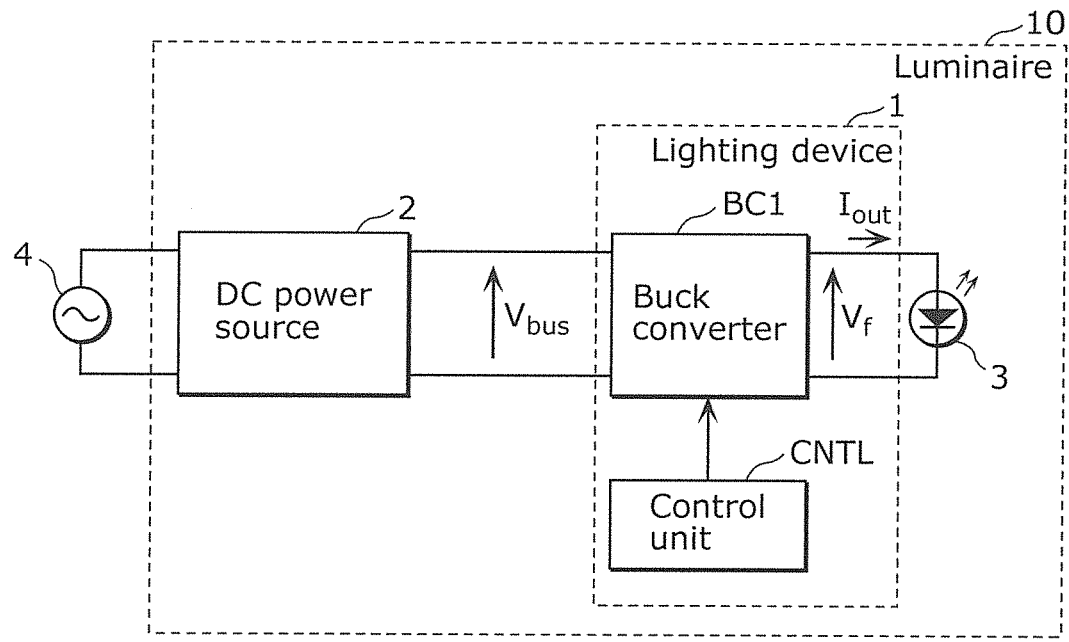
FIG. 3 is a block diagram showing an outline of a lighting device according to Embodiment 1 of the present invention.

FIG. 3 is a block diagram showing an outline of a lighting device 1 according to the present embodiment. This figure illustrates not only the lighting device 1 but also a DC power source 2 for supplying DC power, an AC power source 4 for supplying AC power to the DC power source 2, and a solid-state light-emitting element to be lit up (an LED 3 in the present embodiment). Here, the lighting device 1, the DC power source 2 and the LED 3 are combined to form a luminaire 10.

The lighting device 1 is a circuit that is supplied with a DC voltage having a voltage value Vbus from the DC power source 2 and feeds an electric current Iout to the LED 3 having a forward voltage Vf. As shown in FIG. 3, the lighting device 1 includes a buck converter BC1, which is a kind of DC/DC converters, and a control unit CNTL.

The circuit configuration of the DC power source 2 is not particularly limited but may be, for example, a power factor improvement circuit using a boost converter or a flyback converter.

Figure 4:
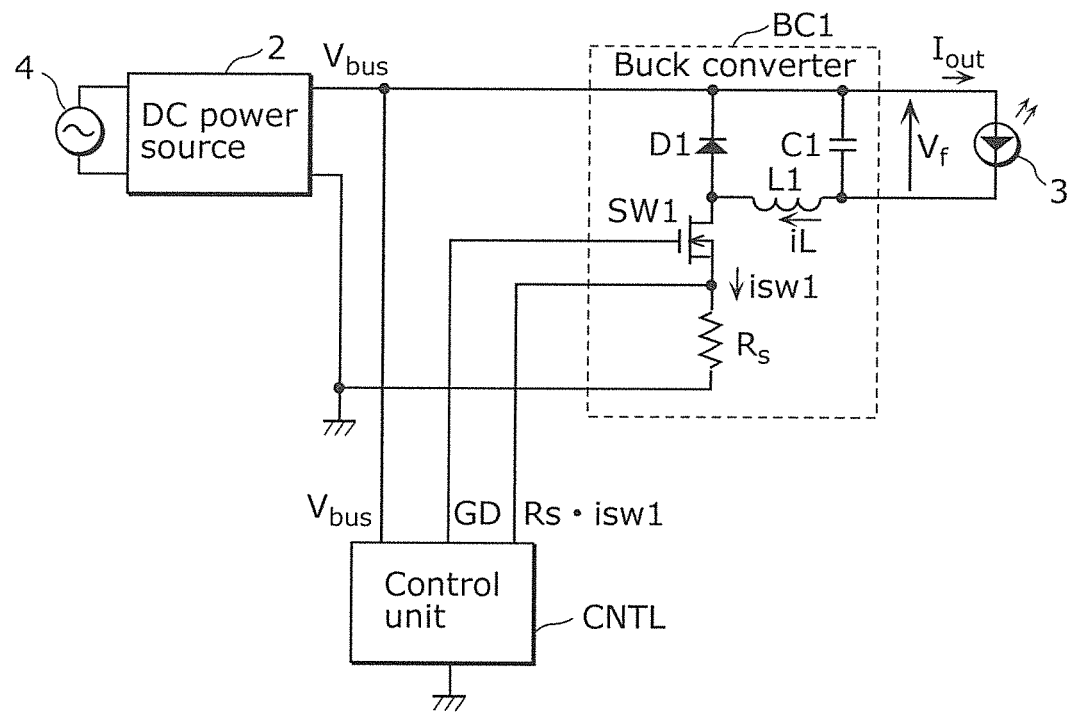
FIG. 4 is a circuit diagram showing the lighting device according to Embodiment 1 of the present invention.

FIG. 4 is a circuit diagram showing the lighting device 1 according to the present embodiment.

The buck converter BC1 includes a switching element SW1, an inductor L1, a diode D1 and a current detection circuit.

The switching element SW1 is an element that is connected in series with the DC power source 2 and turned ON and OFF by the control unit CNTL. The switching element SW1 can be, for example, a MOS-FET or the like.

The inductor L1 is an element that is connected in series with the switching element SW1 and passes an electric current from the DC power source 2 when the switching element SW1 is in an ON state.

The diode D1 is an element that supplies to the LED 3 an electric current released from the inductor L1.

A resistor Rs is an element that constitutes the current detection circuit. The current detection circuit detects an electric current isw1 flowing through the switching element SW1 from a voltage drop Rs·isw1 generated at the resistor Rs.

Figure 1:
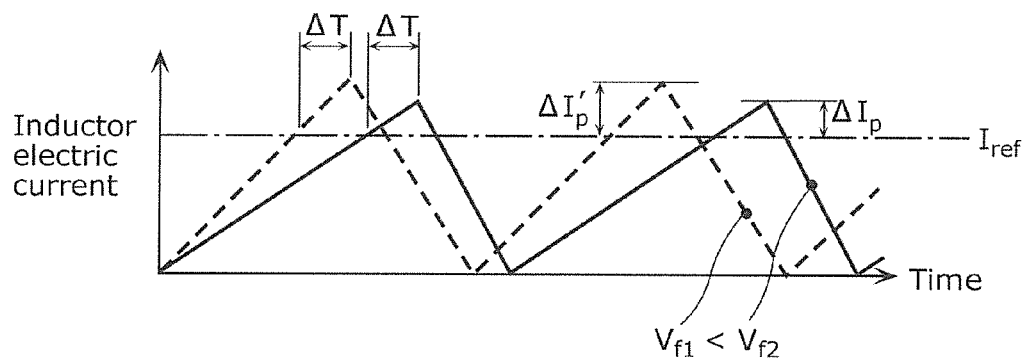
FIG. 1 illustrates how an inductor electric current varies over time under BCM control.
Figure 2:
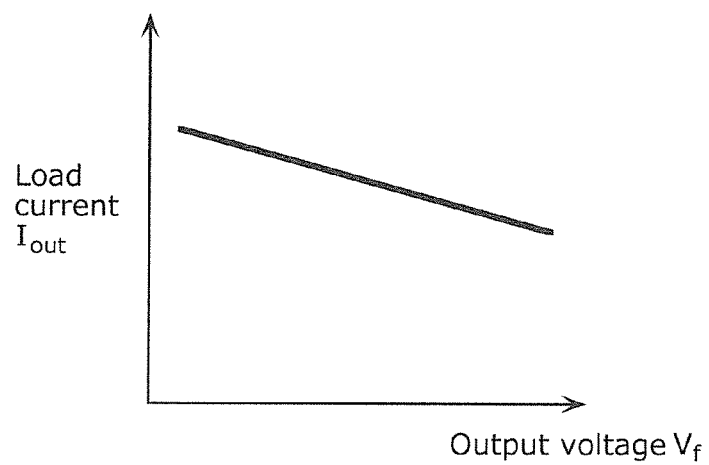
FIG. 2 shows the relationship between an output voltage of a buck converter and a load current.

The buck converter BC1 in the present embodiment further includes a smoothing capacitor C1 that is connected in parallel with the LED 3 and smoothes an electric current to be supplied to the LED 3. A triangular-wave inductor electric current as shown in FIG. 1 is smoothed by the smoothing capacitor C1 and supplied to the LED 3.

Figure 5:
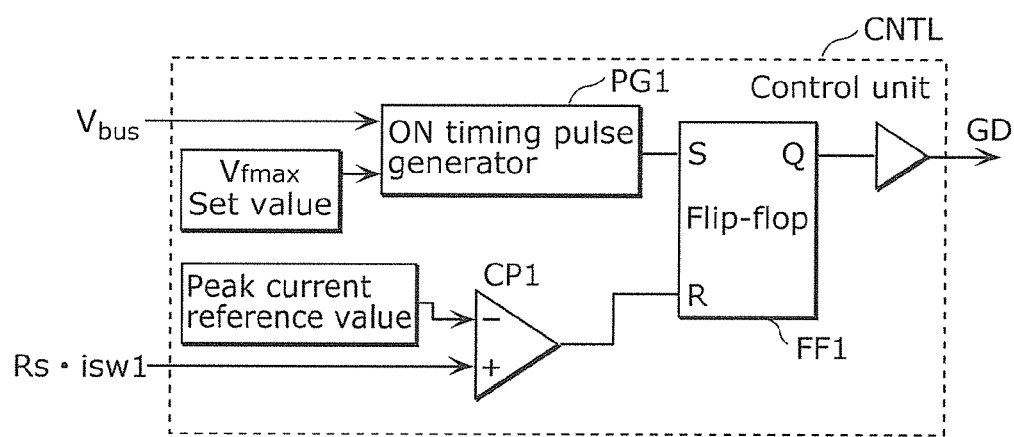
FIG. 5 is a circuit diagram showing a control unit according to Embodiment 1 of the present invention.

FIG. 5 is a circuit diagram showing a simplified configuration of the control unit CNTL.

The control unit CNTL includes an ON timing pulse generator PG1, a comparator CP1 and a flip-flop FF1.

The ON timing pulse generator PG1 is a pulse generator that repeatedly outputs a pulse signal in fixed cycles. The ON timing pulse generator PG1 outputs a pulse signal to a set terminal of the flip-flop FF1 in the fixed cycles determined based on a maximum forward voltage Vfmax of the LED 3 and an output voltage value Vbus of the DC power source 2.

Such fixed cycles each may be a period where timing at which the inductor L1 finishes releasing an electric current and timing at which the switching element SW1 is switched from an OFF state to an ON state coincide with each other when the LED 3 with a maximum forward voltage Vfmax is connected. In other words, such a fixed cycle is set to a period where operation is performed by BCM control when the LED 3 with a maximum forward voltage Vfmax is connected.

The comparator CP1 is a circuit that compares a peak current reference value, which is a target value of a peak current flowing through the inductor L1, with a detection value of an electric current flowing through the switching element SW1 detected by the current detection circuit. The comparator CP1 outputs a High level signal to a reset terminal of the flip-flop FF1 when the detection value of the electric current flowing through the switching element SW1 exceeds the peak current reference value.

The flip-flop FF1 is a circuit whose Q output is connected to a gate terminal of the switching element SW1 via a drive amplifier.

An output signal of the ON timing pulse generator PG1 is inputted to the set terminal of the flip-flop FF1, and when this output signal turns to a High level, the Q output of the flip-flop FF1 turns to a High level.

Also, an output signal of the comparator CP1 is inputted to the reset terminal of the flip-flop FF1, and when this output signal turns to a High level, the Q output of the flip-flop FF1 turns to a Low level.

Herein, the operation of the lighting device 1 in the present embodiment will be explained.

When the ON timing pulse generator PG1 outputs a High level signal in fixed cycles, the Q output of the flip-flop FF1 turns to a High level, so that a High level signal is inputted to the gate terminal of the switching element SW1. Accordingly, the switching element SW1 turns to an ON state, namely, a conducting state.

When the switching element SW1 turns to the ON state, a voltage drop occurs in the inductor L1, so that an electric current flows through the inductor L1 and the switching element SW1. At this time, a reverse voltage is applied to the diode D1, which turns to a non-conducting state. The electric current flowing through the inductor L1 and the switching element SW1 increases with a lapse of time. Then, when the electric current reaches the electric current reference value Iref, the output of the comparator CP1 turns to a High level, and the Q output of the flip-flop FF1 turns to a Low level. Accordingly, the switching element SW1 is switched from the ON state to the OFF state. When the switching element SW1 turns to the OFF state, the electric current flowing through the switching element SW1 is interrupted.

In other words, the control unit CNTL switches the switching element SW1 from the ON state to the OFF state when it senses that the electric current through the switching element SW1 reaches the electric current reference value based on the output signal from the comparator CP1.

There occurs a certain delay time ΔT starting when the detection value of the electric current flowing through the switching element SW1 reaches the electric current reference value Iref until the switching element SW1 is switched from the ON state to the OFF state. This delay time ΔT is a delay time that is needed for response by circuits such as the comparator CP1, the flip-flop FF1 and so on.

Due to this delay time ΔT, the actual peak current value exceeds the electric current reference value Iref by ΔIp or ΔIp' as shown in FIG. 1. Since the forward voltage of the LED 3, which is a load in the lighting device 1, decreases with an increase in rate of change in electric current flowing through the inductor L1 (inductor electric current) over time, the difference of the actual peak current value from the reference electric current value Iref becomes larger.

When the switching element SW1 turns to the OFF state, namely, the non-conducting state, energy stored in the inductor L1 is released, so that the diode D1 turns to the conducting state. At this time, the amount of the inductor electric current decreases from the peak current value with a lapse of time. When the inductor electric current reaches zero, the diode D1 turns to the non-conducting state, so that no electric current flows through the inductor L1, the switching element SW1 and the diode D1.

The rate of change in the inductor electric current over time depends on the forward voltage of the LED 3 serving as a load. Thus, when the switching element SW1 operates as described above, an inductor electric current flowing period T in which an electric current flows through the inductor L1 varies depending on the forward voltage of the LED 3.

In the present embodiment, the forward voltage of the LED 3 to be connected as a load to the buck converter BC1 ranges from Vfmin to Vfmax.

As described above, the ON timing pulse generator PG1 generates a fixed cycle pulse that allows the BCM operation when the LED 3 with a maximum forward voltage Vfmax is connected as the LED 3 to be connected to the lighting device 1.

Figure 6:
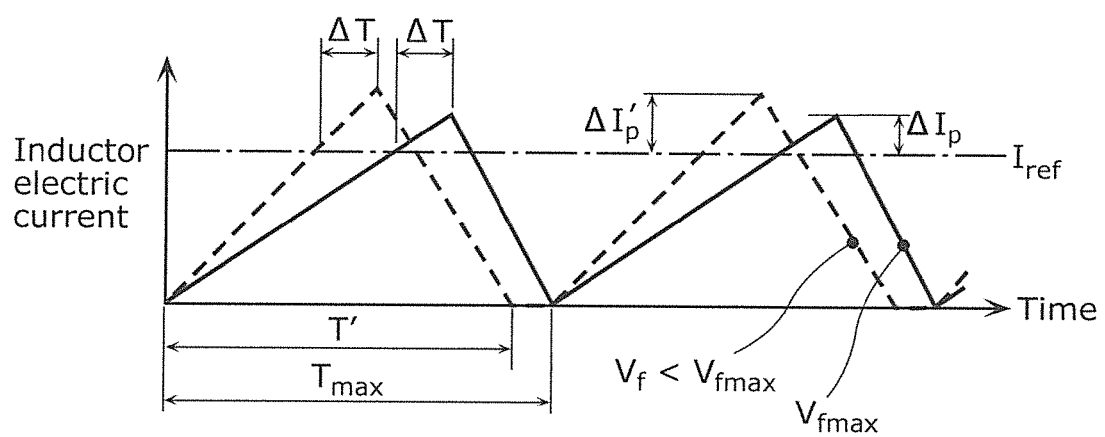
FIG. 6 illustrates how an inductor electric current varies over time in Embodiment 1 of the present invention.

FIG. 6 illustrates how the inductor electric current varies over time in the present embodiment.

When the LED 3 with a forward voltage Vfmax is connected, the inductor electric current varies as indicated by a solid line in FIG. 6, and the inductor electric current flowing period is a period Tmax equal to a cycle period of ON control of the switching element SW1. In other words, when the forward voltage is Vfmax, the lighting device 1 operates in BCM.

Further, when the forward voltage is at least Vfmin and less than Vfmax, the inductor electric current varies as indicated by a dashed line in FIG. 6, and the inductor electric current flowing period is T' (T'<Tmax) as shown in FIG. 6. In other words, when the forward voltage is at least Vfmin and less than Vfmax, the lighting device 1 operates in a discontinuous current mode (DCM).

That is to say, in the lighting device 1 according to the present embodiment, an increase in load current due to an increase in peak value of the inductor electric current when the forward voltage Vf decreases is canceled out by the decrease in inductor electric current flowing period by the DCM operation.

Herein, the inductor electric current flowing period T and the load current Iout1 flowing through the LED 3 in the present embodiment will be analyzed.

When Vf denotes the forward voltage of the LED 3 and L denotes an inductance value of the inductor L1, the inductor electric current flowing period T is expressed by the formula below.

$$T = IrefL\left(\frac{1}{Vbus - Vf} + \frac{1}{Vf}\right) + \Delta T\frac{Vbus}{Vf} \quad \text{[Formula 1]}$$

Further, when Ip denotes the peak value of the inductor electric current, the load current Iout1 flowing through the LED 3 is expressed by the formula below.

$$Iout1 = (T/Tmax) \cdot (Ip/2) \quad \text{[Formula 2]}$$

Figure 7:
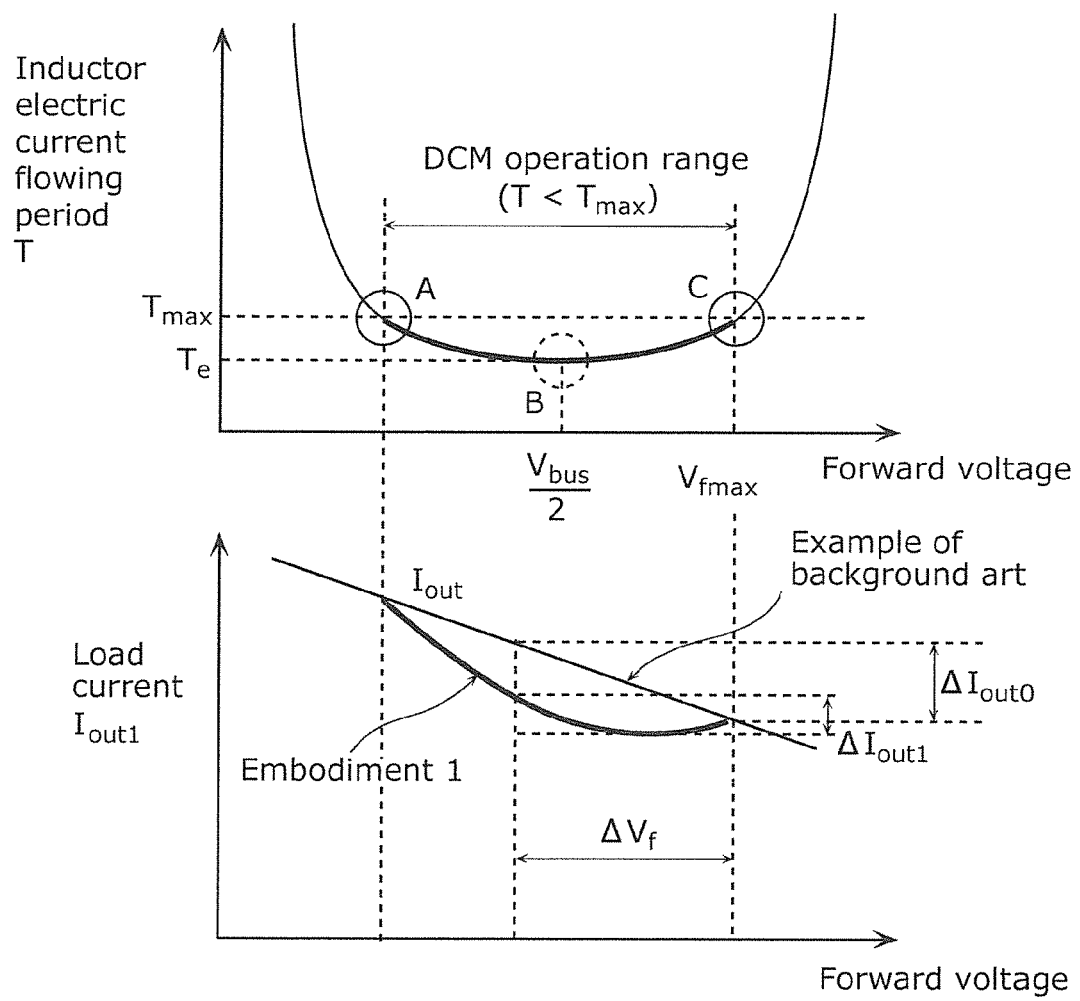
FIG. 7 is a graph showing the relationship of an inductor electric current flowing period T and a load current with respect to a forward voltage in Embodiment 1 of the present invention.

FIG. 7 is a graph showing the relationship of the inductor electric current flowing period T and the load current Iout1 with respect to the forward voltage Vf of the LED 3 obtained from the formulae 1 and 2 above.

The lower section of the graph in FIG. 7 also shows the relationship of the load current Iout1 in an example in the background art (namely, BCM operation) with respect to the forward voltage Vf.

Point C in FIG. 7 indicates a position of the inductor electric current flowing period Tmax when the forward voltage is Vfmax.

Also, point A in FIG. 7 indicates a point achieving the same inductor electric current flowing period as the point C. The forward voltage at point A is substantially equal to the difference between the output voltage value Vbus of the DC power source 2 and the Vfmax.

Further, point B indicates a point at which the inductor electric current flowing period T is a minimum value Te. The forward voltage at point B is substantially Vbus/2.

Figure 8:
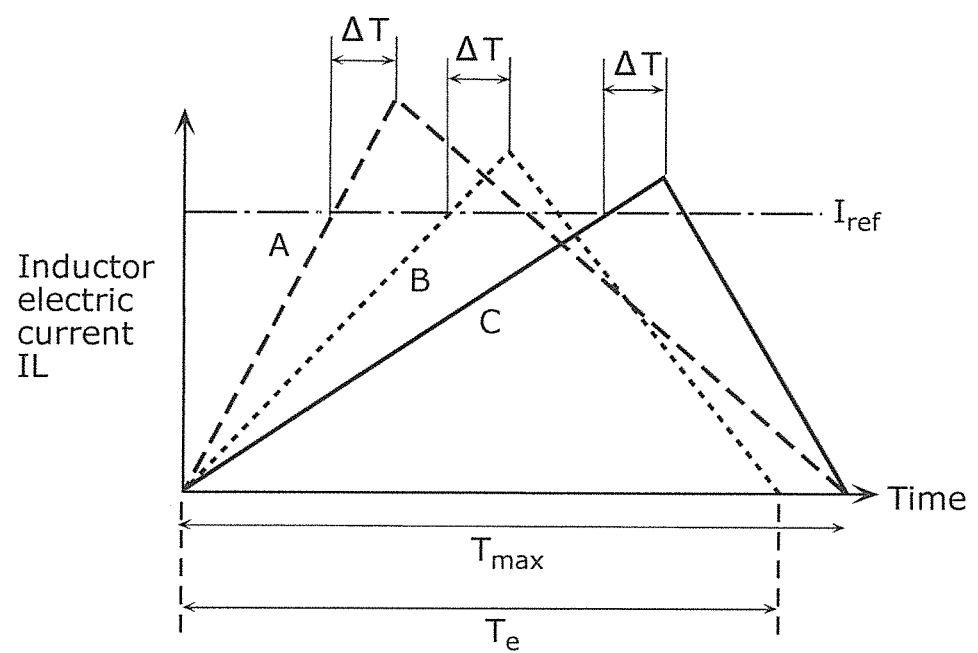
FIG. 8 illustrates how the inductor electric current varies over time with respect to different forward voltages in Embodiment 1 of the present invention.

FIG. 8 illustrates how the inductor electric current varies over time for the individual forward voltages at points A, B and C shown in FIG. 7.

As shown in FIG. 8, it can be understood that the lighting device 1 operates in the BCM in the cases of point A (dashed line) and point C (solid line). Also, in the case of point B, the lighting device 1 is understood to operate in the DCM.

Similarly, if the inductor electric current flowing period T is shorter than Tmax, i.e., Vf is larger than the difference between the Vbus and Vfmax and smaller than Vfmax, the lighting device 1 operates in the DCM.

A lower section of the graph in FIG. 7 illustrates an amount of change ΔIout1 in load current Iout1 in the present embodiment and an amount of change ΔIout0 in load current in an example of the background art (namely, the BCM operation) when the forward voltage Vf varies from Vfmax within a range of ΔVf.

As shown in FIG. 7, by setting Vfmax and ΔVf appropriately, it is possible to achieve ΔIout1 smaller than ΔIout0.

As shown in the lower section of the graph in FIG. 7, the load current Iout1 in the present embodiment is at its minimum value at a point where the forward voltage is higher than Vbus/2. Thus, the amount of variation in load current Iout1 with respect to the forward voltage is particularly small near the above-noted minimum value.

Accordingly, by setting this Vfmax at a value larger than or equal to Vbus/2, it would be possible to further suppress the variation in load current Iout1 with respect to Vf. Also, when Vf is substantially equal to the difference between Vbus and Vfmax (Vf at point A in FIG. 7), the load current Iout1 is equivalent to a load current in an example of the background art. Thus, it is desired that the minimum value Vfmin of the forward voltage should be set to be larger than or equal to the difference between Vbus and Vfmax.

As described above, the lighting device 1 according to the present embodiment allows the light output of the LED 3 to be stabilized with a simple configuration.

Incidentally, although only one buck converter is provided in the present embodiment, a plurality of buck converters may be provided to supply an electric current to different LEDs respectively.

Embodiment 2

Next, a lighting device and a luminaire in Embodiment 2 of the present invention will be described.

Figure 9:
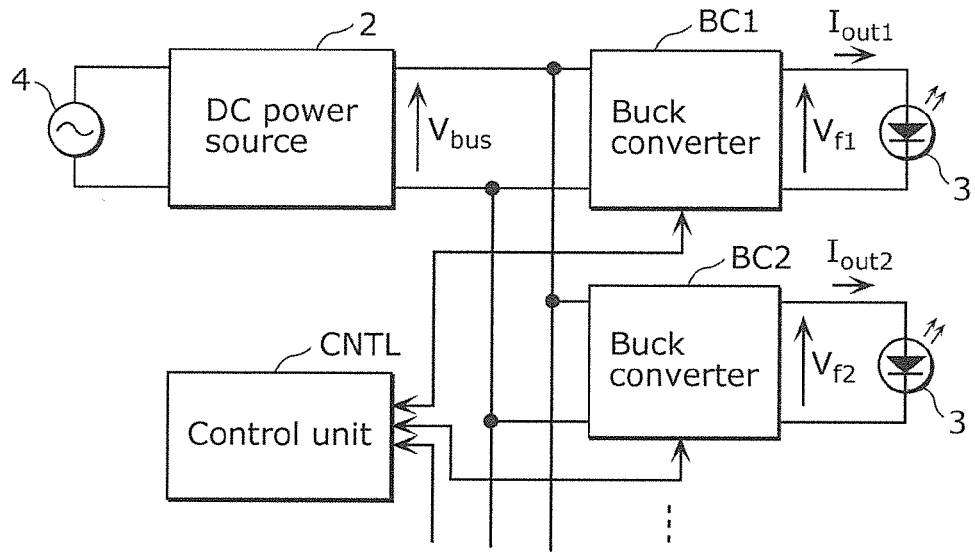
FIG. 9 is a block diagram showing an outline of a lighting device according to Embodiment 2 of the present invention.

FIG. 9 is a block diagram showing an outline of a lighting device 1 according to the present embodiment.

The lighting device 1 in the present embodiment includes a plurality of buck converters BC1, BC2, . . . and a control unit CNTL.

Also in the present embodiment, the lighting device 1, a DC power source 2 and a plurality of LEDs 3 are combined to form a luminaire 10 similarly to Embodiment 1.

As shown in FIG. 9, each of the buck converters is connected in parallel with an output terminal of the DC power source 2.

The control unit CNTL is a processing unit that controls the buck converters so that load currents Iout1, Iout2, . . . of these buck converters are constant and equal to one another.

Outputs of the individual buck converters are respectively connected with the LEDs 3 serving as loads. The LEDs 3 may have different forward voltages.

Figure 10:
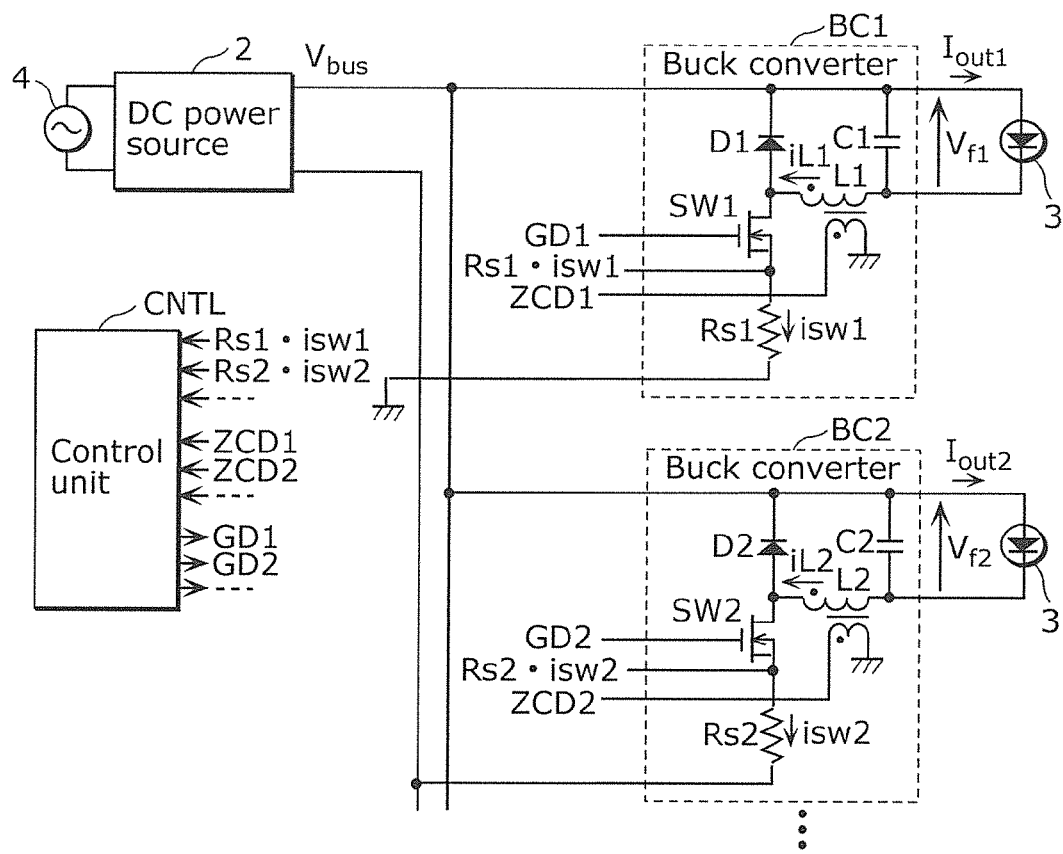
FIG. 10 is a circuit diagram showing the lighting device according to Embodiment 2 of the present invention.

FIG. 10 is a circuit diagram showing the lighting device 1 according to the present embodiment.

The buck converters BC1, BC2, . . . shown in FIG. 10 are different from the buck converter BC1 in Embodiment 1 in that they are respectively provided with auxiliary windings for detecting a zero electric current of inductors L1, L2, . . . .

Voltage values ZCD1, ZCD2, . . . outputted from the auxiliary windings provided in the inductors L1, L2, . . . are proportional to time derivatives of electric currents flowing through the respective inductors. Also, the voltage values outputted from the auxiliary windings generate positive or negative voltages when electric currents iL1, iL2, . . . flowing through the inductors L1, L2, . . . increase or decrease over time, and do not generate any voltages when the electric currents iL1, iL2, . . . are constant.

Figure 11:
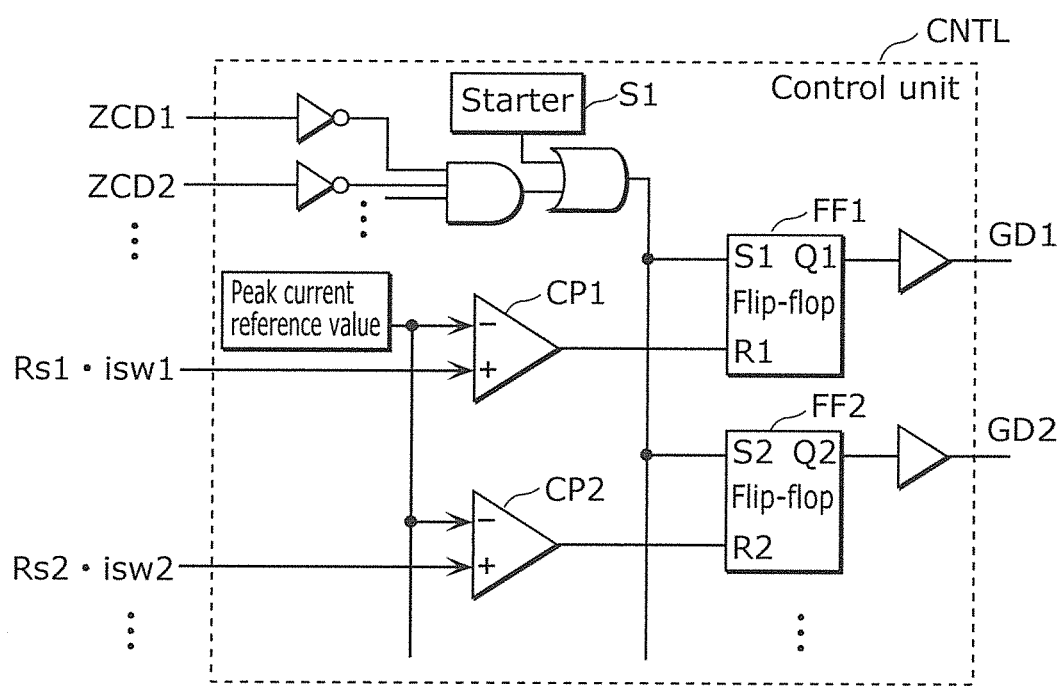
FIG. 11 is a circuit diagram showing a control unit according to Embodiment 2 of the present invention.

FIG. 11 is a circuit diagram showing a simplified internal configuration of the control unit CNTL in the present embodiment.

The control unit CNTL includes a sensing circuit for sensing that the electric currents of all of the inductors included in the individual buck converters are zero, and comparators CP1, CP2, . . . for comparing a detection value of the inductor electric current with a peak current reference value. Here, the sensing circuit is configured by a logic circuit that outputs a logical product of negations of the voltage values ZCD1, ZCD2, . . . .

Further, the control unit CNTL includes a starter S1 for generating a start pulse signal at startup of the lighting device, and flip-flops FF1, FF2, . . . corresponding to the buck converters BC1, BC2, . . . .

A set terminal of each of the flip-flops in the control unit CNTL is supplied with a logical sum of the start pulse signal from the starter S1 and the logical product of the negations of the voltage values ZCD1, ZCD2, . . . . Accordingly, when the start pulse signal is generated or when all of the voltage values ZCD1, ZCD2, . . . are at a Low level, Q outputs of all of the flip-flops turn to a High level.

The comparators CP1, CP2, . . . compare electric currents isw1, isw2, . . . flowing through switching elements SW1, SW2, . . . with a peak current reference value Iref. Here, the peak current reference value Iref is a target value of a peak current of each of the switching elements, and this value is set according to a desired load current value Iout.

An output of each of the comparators turns to a High level when the electric current flowing through each of the switching elements is larger than the peak current reference value Iref. The outputs of the comparators CP1, CP2, . . . are inputted to reset terminals of the flip-flops FF1, FF2, . . . , respectively. Then, when the outputs of the individual comparators turn to a High level, the Q outputs of the corresponding flip-flops turn to a Low level.

The Q outputs of the flip-flops FF1, FF2, ... are connected to gate terminals of the switching elements SW1, SW2, ..., respectively. Thus, when the Q output of each of the flip-flops turns to a High level, each of the switching elements turns to an ON state, namely, a conducting state. Also, when the Q output of each of the flip-flops turns to a Low level, each of the switching elements turns to an OFF state, namely, a non-conducting state.

Herein, the operation of the lighting device 1 in the present embodiment will be explained.

At startup of the lighting device 1, the start pulse signal generated by the starter S1 is inputted to the set terminals of all of the flip-flops simultaneously. The start pulse signal is inputted to the set terminals, whereby the Q outputs of all of the flip-flops turn to a High level, so that all of the switching elements turn to the ON state simultaneously.

When all of the switching elements turn to the ON state, an applied voltage of the DC power source 2 causes a voltage drop in all of the inductors, so that an electric current flows from the DC power source 2 to all the inductors and all the switching elements.

At this time, a reverse voltage is applied to all diodes, so that a non-conducting state is reached.

The electric current flowing through all the inductors and all the switching elements increases with a lapse of time.

Here, the rate of change in electric current flowing through the inductors and the switching elements over time depends on the forward voltage of the LEDs 3 serving as loads. Thus, the electric currents flowing through the individual inductors and switching elements reach the peak current reference value Iref at timing depending on the forward voltages of the corresponding LEDs 3 that are connected.

When an electric current flowing through a certain switching element SWk (k=1, 2, ... ) reaches the peak current reference value Iref, an output of a comparator CPk turns to a High level, so that this output is inputted to a reset terminal of a flip-flop FFk.

Since a Q output of the flip-flop FFk is a Low level, the switching element SWk whose gate terminal is supplied with that Q output is switched from an ON state to an OFF state, whereby the electric current flowing through the switching element SWk is interrupted.

When the switching element SWk turns to the OFF state, namely, a non-conducting state, a diode Dk included in a buck converter BCk turns to a conducting state, whereby an electric current flows through an inductor Lk and the diode Dk. This electric current decreases from a peak current value with a lapse of time, and when the electric current flowing through the inductor Lk reaches zero, the diode Dk turns to a non-conducting state.

At this time, when the electric current flowing through the inductor Lk decreases to zero, a voltage generated in an auxiliary winding ZCDk of the inductor Lk shifts from a High level to a Low level, so that it is possible to detect that zero electric current is reached.

When a logic gate included in the control unit turns all of the auxiliary winding voltages to a Low level, namely, brings the electric currents flowing through all of the inductors to zero, an output of an AND gate turns to a High level. Accordingly, the High level is inputted to the set terminals of all the flip-flops, so that all the switching elements are switched from the OFF state to the ON state simultaneously.

In other words, when all of the inductor electric currents are sensed as zero, the operation of turning ON all of the switching elements is carried out. Thus, the buck converter having the longest inductor electric current flowing period operates in the BCM, and the remaining buck converters operate in the DCM in synchronization with that buck converter. Here, the forward voltage value of the LED 3 connected to the buck converter operating in the BCM among the individual buck converters is largest among all the forward voltages.

In the lighting device 1 of the present embodiment, with the operation described above, the difference in load current among the individual buck converters is suppressed similarly to Embodiment 1. In other words, an increase in load current due to an increase in peak current of the inductor electric current of the buck converter connected with the LED 3 having a small forward voltage can be canceled out by the decrease in inductor electric current flowing period by the DCM operation. Therefore, the present embodiment makes it possible to suppress the difference among the individual load currents compared with the case of adopting a configuration of the background art in which all the buck converters operate in the BCM.

Further, also in the present embodiment, the inductor electric current flowing period T of each of the buck converters and the load current depend on the forward voltage Vf of the LED 3 connected to each buck converter and have minimum values as shown in FIG. 7 similarly to Embodiment 1.

Thus, in the present embodiment, it is desired that the largest forward voltage Vfmax among the forward voltages of the LEDs 3 connected to the individual buck converters should be larger than ½ of the output voltage Vbus of the DC power source 2. Also, it is desired that the smallest forward voltage Vfmin among the forward voltages of the LEDs 3 connected to the individual buck converters should be larger than the difference between Vbus and Vfmax.

As described above, in the present embodiment, it is possible to suppress the difference in load current of the individual buck converters, i.e., variations in light output among the plural LEDs 3 serving as loads compared with the case of adopting the configuration of the background art in which all the buck converters operate in the BCM.

Embodiment 3

Now, a lighting device and a luminaire in Embodiment 3 of the present invention will be described.

Figure 12:
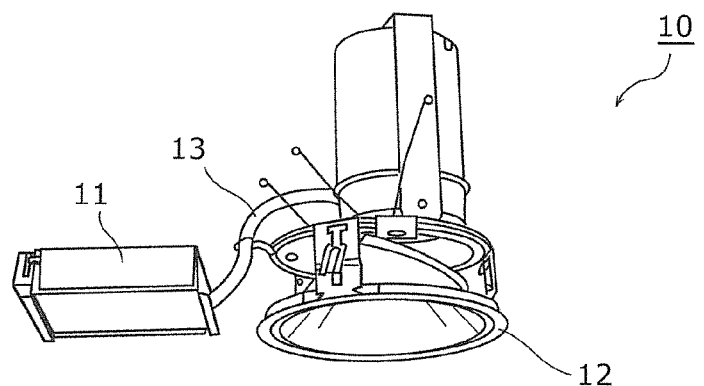
FIG. 12 illustrates an external appearance of an exemplary luminaire according to Embodiment 3 of the present invention.
Figure 13:
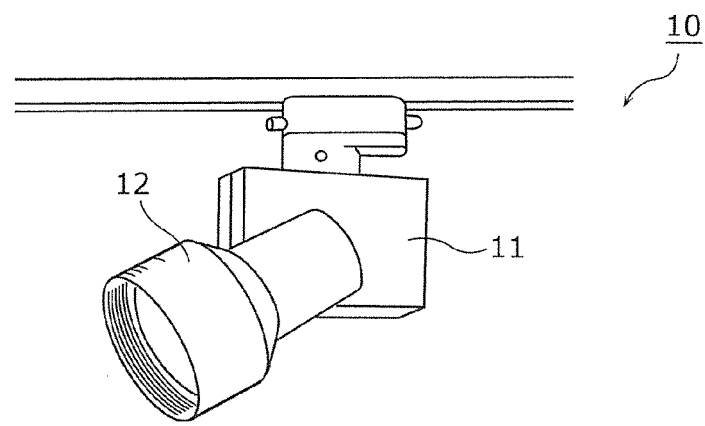
FIG. 13 illustrates an external appearance of another exemplary luminaire according to Embodiment 3 of the present invention.
Figure 14:
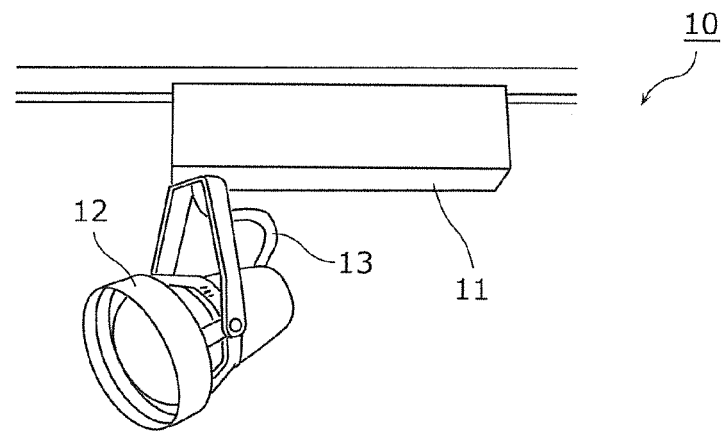
FIG. 14 illustrates an external appearance of another exemplary luminaire according to Embodiment 3 of the present invention.

Each of FIGS. 12 to 14 illustrates an external appearance of a luminaire 10 in the present embodiment.

FIG. 12 illustrates an example of applying the luminaire 10 to a down light, and each of FIGS. 13 and 14 illustrates an example of applying the luminaire 10 to a spot light.

Each of the luminaires 10 shown in FIGS. 12 to 14 includes a circuit box 11 and a lamp 12, and the luminaire 10 shown in FIG. 12 further includes wiring 13.

The circuit box 11 contains the lighting device 1 and the DC power source 2 described above, and an LED is mounted in the lamp 12.

Moreover, the wiring 13 electrically connects the circuit box 11 and the lamp 12.

In the present embodiment, the above-described lighting device 1 is used in the luminaire 10, thereby allowing an electric current flowing through the LED to have a desired electric current value. Thus, it is possible to suppress variations in light output of the individual luminaires 10 in the case of installing the plural luminaires 10 in one space.

Also, when the luminaire 10 includes a plurality of LEDs, it is possible to suppress color unevenness among the LEDs.

As described above, the lighting device according to Embodiment 1 is a lighting device that is connected to a DC power source and supplies an electric current to a solid-state light-emitting element whose forward voltage ranges from Vfmin to Vfmax. The lighting device includes: a DC/DC converter; and a control unit. The DC/DC converter includes: a switching element that is connected in series with the DC power source and turned ON and OFF; an inductor that is connected in series with the switching element and supplied with an electric current from the DC power source when the switching element is in an ON state; a diode that supplies, to the solid-state light-emitting element, an electric current released from the inductor; and a current detection circuit that detects an electric current flowing through the switching element and outputs a current detection value of the electric current that is detected. The control unit includes a comparator that compares the current detection value with an electric current reference value, is configured to (i) switch the switching element from the ON state to an OFF state when the control unit senses that the current detection value reaches the electric current reference value based on an output signal from the comparator, and (ii) switch the switching element from the OFF state to the ON state in fixed cycles, each of which being a period where timing at which the inductor finishes releasing the electric current and timing at which the switching element is switched from the OFF state to the ON state coincide with each other when the forward voltage of the solid-state light-emitting element connected to the lighting device is the Vfmax.

This makes it possible to stabilize an average electric current flowing through the solid-state light-emitting elements regardless of the forward voltages of the solid-state light-emitting elements. Thus, even when there are variations in forward voltage or rated voltage among the solid-state light-emitting elements, the variations in electric current to be outputted to the solid-state light-emitting elements can be suppressed. Moreover, such a lighting device has a relatively simple configuration.

Also, in Embodiment 1, the Vfmax may be larger than ½ of an output voltage value of the DC power source.

This makes it possible to further suppress the variations in electric current to be outputted to the solid-state light-emitting elements.

Additionally, in Embodiment 1, the Vfmin may be larger than a difference between the output voltage value of the DC power source and the Vfmax.

This makes it possible to suppress the variations in electric current to be outputted to the solid-state light-emitting elements more reliably.

Also, in Embodiment 1, the control unit may further include a pulse generator that repeatedly outputs a pulse signal in the fixed cycles, the pulse generator determining the fixed cycles based on an output voltage value of the DC power source and a forward voltage value of the solid-state light-emitting element to be connected to the lighting device.

This makes it possible to set a switching cycle of the switching element according to the forward voltage of the solid-state light-emitting element and the output voltage of the DC power source.

Further, a lighting device according to Embodiment 2 is a lighting device that is connected to a DC power source and supplies an electric current to a plurality of solid-state light-emitting elements. The lighting device includes: a plurality of DC/DC converters; and a control unit. The plurality of DC/DC converters each include: a switching element that is connected in series with the DC power source and turned ON and OFF; an inductor that is connected in series with the switching element and supplied with an electric current from the DC power source when the switching element is in an ON state; a diode that supplies, to one of the plurality of solid-state light-emitting elements, an electric current released from the inductor; and a current detection circuit that detects an electric current flowing through the switching element and outputs a current detection value of the electric current that is detected. The control unit includes: a sensing circuit that senses that the electric current through the inductor included in every one of the plurality of DC/DC converters is zero; and a plurality of comparators that are in one-to-one correspondence with the plurality of DC/DC converters. The plurality of comparators each compare the current detection value with an electric current reference value. The control unit is configured to (i) switch the switching element corresponding to one of the plurality of comparators from the ON state to an OFF state when the control unit senses that the current detection value reaches the electric current reference value based on an output signal from the one of the plurality of comparators, and (ii) switch the switching element included in every one of the plurality of DC/DC converters simultaneously from the OFF state to the ON state when the sensing circuit senses that the electric current through the inductor included in every one of the plurality of DC/DC converters is zero.

In this way, an electric current to be outputted to the plurality of solid-state light-emitting elements can be stabilized to have a desired value.

Also, in Embodiment 2, the electric current reference value may be common to the plurality of comparators.

This makes it possible to suppress the variations in electric current to be outputted to the plurality of solid-state light-emitting elements.

Moreover, in Embodiment 2, Vfmax may be larger than ½ of an output voltage value of the DC power source, where Vfmax denotes a maximum forward voltage among forward voltages of the plurality of solid-state light-emitting elements.

In this way, an electric current to be outputted to the plurality of solid-state light-emitting elements can be stabilized further.

Additionally, in Embodiment 2, Vfmin may be larger than a difference between the output voltage value of the DC power source and the Vfmax, where Vfmin denotes a minimum forward voltage among the forward voltages of the plurality of solid-state light-emitting elements.

In this way, an electric current to be outputted to the plurality of solid-state light-emitting elements can be stabilized more reliably.

The above description has been directed to the lighting device and the luminaire according to embodiments of the present invention. However, the present invention is not limited to these embodiments. As long as not departing from the purpose of the present invention, various modifications to the above embodiments conceivable by a person skilled in the art and modes configured by combining structural components in different embodiments may also fall within the scope of one or more embodiments of the present invention.

For example, in the lighting devices described in the above embodiments, the LED has been used as the solid-state light-emitting element. However, the solid-state light-emitting element according to an aspect of the present invention may be replaced with another solid-state light-emitting element such as an organic EL element or the like.

Also, in the case of applying the lighting device described in the above embodiments to a plurality of luminaires, either type of the lighting devices in Embodiments 1 and 2 described above may be applied to all the luminaires, or both types of these lighting devices may be mixed and applied to the plurality of luminaires. Furthermore, in the case of applying the lighting device in Embodiment 2 above to a plurality of luminaires, the individual buck converters may be divided and received in their corresponding luminaires or may be put together and received in a single luminaire.

Moreover, in the lighting device of the above-described embodiments, the buck converter has been described as an example of the DC/DC converter. However, the DC/DC converter according to an aspect of the present invention is not limited to the buck converter indicated in each embodiment. Any DC/DC converter could be employed as long as it includes a switching element, an inductor and a diode and operates as described below. That is to say, the DC/DC converter may be any DC/DC converter as long as it operates such that the inductor is supplied with an electric current to store energy when the switching element is in an ON state, and the energy stored in the inductor is discharged via the diode when the switching element is in an OFF state.

Additionally, in the above described embodiments, the maximum value and the minimum value of the forward voltage of the solid-state light-emitting element have been determined based on the output voltage value of the DC power source. However, it is conversely possible to regulate the output voltage value of the DC power source based on the maximum value and the minimum value of the forward voltage of the solid-state light-emitting element.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device that is connected to a DC power source and supplies an electric current to a solid-state light-emitting element whose forward voltage ranges from Vfmin to Vfmax, the lighting device comprising:
a DC/DC converter; and
a control unit,
wherein the DC/DC converter includes:
a switching element that is connected in series with the DC power source and turned ON and OFF;
an inductor that is connected in series with the switching element and supplied with an electric current from the DC power source when the switching element is in an ON state;
a diode that supplies, to the solid-state light-emitting element, an electric current released from the inductor; and
a current detection circuit that detects an electric current flowing through the switching element and outputs a current detection value of the electric current that is detected,
the control unit includes a comparator that compares the current detection value with an electric current reference value, is configured to (i) switch the switching element from the ON state to an OFF state when the control unit senses that the current detection value reaches the electric current reference value based on an output signal from the comparator, and (ii) switch the switching element from the OFF state to the ON state in fixed cycles, each of which being a period where timing at which the inductor finishes releasing the electric current and timing at which the switching element is switched from the OFF state to the ON state coincide with each other when the forward voltage of the solid-state light-emitting element connected to the lighting device is the Vfmax.

2. The lighting device according to claim 1,
wherein the Vfmax is larger than ½ of an output voltage value of the DC power source.

3. The lighting device according to claim 2,
wherein the Vfmin is larger than a difference between the output voltage value of the DC power source and the Vfmax.

4. The lighting device according to claim 1,
wherein the control unit further includes a pulse generator that repeatedly outputs a pulse signal in the fixed cycles, the pulse generator determining the fixed cycles based on an output voltage value of the DC power source and a forward voltage value of the solid-state light-emitting element to be connected to the lighting device.

5. A luminaire comprising:
the lighting device according to claim 1; and
a solid-state light-emitting element whose forward voltage ranges from Vfmin to Vfmax.

6. A lighting device that is connected to a DC power source and supplies an electric current to a plurality of solid-state light-emitting elements, the lighting device comprising:
a plurality of DC/DC converters; and
a control unit,
wherein the plurality of DC/DC converters each include:
a switching element that is connected in series with the DC power source and turned ON and OFF;
an inductor that is connected in series with the switching element and supplied with an electric current from the DC power source when the switching element is in an ON state;
a diode that supplies, to one of the plurality of solid-state light-emitting elements, an electric current released from the inductor; and
a current detection circuit that detects an electric current flowing through the switching element and outputs a current detection value of the electric current that is detected,
the control unit includes:
a sensing circuit that senses that the electric current through the inductor included in every one of the plurality of DC/DC converters is zero; and
a plurality of comparators that are in one-to-one correspondence with the plurality of DC/DC converters, the plurality of comparators each comparing the current detection value with an electric current reference value, and
the control unit is configured to
(i) switch the switching element corresponding to one of the plurality of comparators from the ON state to an OFF state when the control unit senses that the current detection value reaches the electric current reference value based on an output signal from the one of the plurality of comparators, and
(ii) switch the switching element included in every one of the plurality of DC/DC converters simultaneously from the OFF state to the ON state when the sensing circuit senses that the electric current through the inductor included in every one of the plurality of DC/DC converters is zero.

7. The lighting device according to claim 6,
wherein the electric current reference value is common to the plurality of comparators.

8. The lighting device according to claim 6,
wherein Vfmax is larger than ½ of an output voltage value of the DC power source, where Vfmax denotes a maximum forward voltage among forward voltages of the plurality of solid-state light-emitting elements.

9. The lighting device according to claim 8,
wherein Vfmin is larger than a difference between the output voltage value of the DC power source and the Vfmax, where Vfmin denotes a minimum forward voltage among the forward voltages of the plurality of solid-state light-emitting elements.

10. A luminaire comprising:
the lighting device according to claim 6; and
a plurality of solid-state light-emitting elements.

11. A method for designing a lighting device that is connected to a DC power source and supplies an electric current to a solid-state light-emitting element whose forward voltage ranges from Vfmin to Vfmax,
wherein the lighting device includes a DC/DC converter and a control unit,
the DC/DC converter includes:
a switching element that is connected in series with the DC power source and turned ON and OFF;
an inductor that is connected in series with the switching element and supplied with an electric current from the DC power source when the switching element is in an ON state;
a diode that supplies, to the solid-state light-emitting element, an electric current released from the inductor; and
a current detection circuit that detects an electric current flowing through the switching element and outputs a current detection value of the electric current that is detected,
the control unit includes a comparator that compares the current detection value with an electric current reference value, is configured to (i) switch the switching element from the ON state to an OFF state when the control unit senses that the current detection value reaches the electric current reference value based on an output signal from the comparator, and (ii) switch the switching element from the OFF state to the ON state in fixed cycles,
the method comprising
setting the fixed cycles for the lighting device so that timing at which the inductor finishes releasing the electric current and timing at which the switching element is switched from the OFF state to the ON state coincide with each other when the forward voltage of the solid-state light-emitting element connected to the lighting device is the Vfmax.

12. The method for designing a lighting device according to claim 11, further comprising
setting the Vfmax to be larger than ½ of an output voltage value of the DC power source.

13. The method for designing a lighting device according to claim 12, further comprising
setting the Vfmin to be larger than a difference between the output voltage value of the DC power source and the Vfmax.

14. A method for manufacturing a lighting device that is connected to a DC power source and supplies an electric current to a solid-state light-emitting element whose forward voltage ranges from Vfmin to Vfmax, the method comprising:
providing a DC/DC converter including: a switching element that is connected in series with the DC power source and turned ON and OFF; an inductor that is connected in series with the switching element and supplied with an electric current from the DC power source when the switching element is in an ON state; a diode that supplies, to the solid-state light-emitting element, an electric current released from the inductor; and a current detection circuit that detects an electric current flowing through the switching element and outputs a current detection value of the electric current that is detected;
providing a control unit including a comparator that compares the current detection value with an electric current reference value, and configured to (i) switch the switching element from the ON state to an OFF state when the control unit senses that the current detection value reaches the electric current reference value based on an output signal from the comparator, and (ii) repeatedly switch the switching element from the OFF state to the ON state in fixed cycles; and
setting the fixed cycles for the lighting device so that timing at which the inductor finishes releasing the electric current and timing at which the switching element is switched from the OFF state to the ON state coincide with each other when the forward voltage of the solid-state light-emitting element connected to the lighting device is the Vfmax.

15. The method for manufacturing a lighting device according to claim 14, further comprising
setting the Vfmax to be larger than ½ of an output voltage value of the DC power source.

16. The method for manufacturing a lighting device according to claim 15, further comprising
setting the Vfmin to be larger than a difference between the output voltage value of the DC power source and the Vfmax.

* * * * *